United States Patent
Toebes

(10) Patent No.: US 10,214,354 B2
(45) Date of Patent: Feb. 26, 2019

(54) METHOD AND SYSTEM FOR AUTOMATED TRANSPORT OF ITEMS

(71) Applicant: NEXTSHIFT ROBOTICS, INC., Andover, MA (US)

(72) Inventor: Stephen C. Toebes, Chelmsford, MA (US)

(73) Assignee: NEXTSHIFT ROBOTICS, Inc., Andover, MA (US)

(*) Notice: Subject to any disclaimer, the term of this patent is extended or adjusted under 35 U.S.C. 154(b) by 0 days.

(21) Appl. No.: 14/972,722

(22) Filed: Dec. 17, 2015

(65) Prior Publication Data

US 2016/0176638 A1 Jun. 23, 2016

Related U.S. Application Data

(60) Provisional application No. 62/093,786, filed on Dec. 18, 2014.

(51) Int. Cl.

| | |
|---|---|
| *B65G 1/137* | (2006.01) |
| *B65G 1/04* | (2006.01) |
| *B66F 9/06* | (2006.01) |
| *G05D 1/02* | (2006.01) |
| *G05B 19/418* | (2006.01) |

(Continued)

(52) U.S. Cl.
CPC ............ *B65G 1/0492* (2013.01); *B25J 5/007* (2013.01); *B65G 1/137* (2013.01); *B65G 1/1373* (2013.01); *B66F 9/06* (2013.01); *B66F 9/063* (2013.01); *G05B 19/41895* (2013.01); *G05D 1/0212* (2013.01); *G05D 1/0276* (2013.01); *G05D 1/0282* (2013.01); *G06Q 10/087* (2013.01);

(Continued)

(58) Field of Classification Search
CPC .... B65G 1/137; B65G 1/0492; B65G 1/1373; B66F 9/063
See application file for complete search history.

(56) References Cited

U.S. PATENT DOCUMENTS

| | | | | |
|---|---|---|---|---|
| 5,758,298 A | * | 5/1998 | Guldner ................ | G01S 15/931 318/580 |
| 7,591,630 B2 | * | 9/2009 | Lert, Jr. ............... | B65G 1/0492 414/807 |

(Continued)

FOREIGN PATENT DOCUMENTS

WO WO 2014/207021 * 6/2014 ............. B65G 1/137

*Primary Examiner* — Thomas Randazzo
(74) *Attorney, Agent, or Firm* — Perman & Green, LLP

(57) ABSTRACT

An automated distribution center includes an array with storage locations arranged along aisle(s) having a floor, and a mezzanine platform above the floor, the floor and mezzanine being configured for human picker access to the storage locations, an automated guided vehicle (AGV) configured for traverse of the floor and mezzanine to the storage locations, and for transporting a storage container to and from the storage locations, the floor and mezzanine each having an undeterministic traverse surface for the AGV, the AGV is configured so that the surface provides holonomic selectable paths for the AGV substantially everywhere on the surface, each path being selectable by the AGV, and an order filling station, where one or more goods are picked from container(s) to fill order(s), wherein the AGV is configured to pick the container from a storage location and transport the container on the surface between the storage array and the station.

16 Claims, 10 Drawing Sheets

(51) Int. Cl.
 *G06Q 10/08* (2012.01)
 *B25J 5/00* (2006.01)
(52) U.S. Cl.
 CPC ..... *G05D 2201/0216* (2013.01); *Y10S 901/01* (2013.01)

(56) References Cited

U.S. PATENT DOCUMENTS

| | | | | |
|---|---|---|---|---|
| 7,912,574 | B2* | 3/2011 | Wurman | G05B 19/4189 700/213 |
| 7,991,505 | B2* | 8/2011 | Lert, Jr. | B65G 1/0492 198/347.1 |
| 8,425,173 | B2* | 4/2013 | Lert | B65G 1/045 414/280 |
| 9,002,506 | B1* | 4/2015 | Agarwal | B65G 1/137 700/216 |
| 9,008,884 | B2* | 4/2015 | Toebes | B65G 1/0492 701/23 |
| 9,037,286 | B2* | 5/2015 | Lert | B65G 1/1378 700/216 |
| 9,075,412 | B2* | 7/2015 | Dixon | G05D 1/0022 |
| 9,321,591 | B2* | 4/2016 | Lert | B65G 1/0492 |
| 9,410,811 | B2* | 8/2016 | Pfaff | G05D 1/0217 |
| 9,550,624 | B2* | 1/2017 | Khodl | B25J 5/007 |
| 9,568,917 | B2* | 2/2017 | Jones | G06Q 10/08 |
| 2010/0316468 | A1* | 12/2010 | Lert | B65G 1/045 414/273 |
| 2014/0343713 | A1* | 11/2014 | Ziegler | B65G 1/137 700/214 |
| 2015/0032252 | A1* | 1/2015 | Galluzzo | B25J 5/007 700/218 |
| 2015/0081089 | A1* | 3/2015 | Kapust | B65G 1/1373 700/218 |
| 2016/0107838 | A1* | 4/2016 | Swinkels | B66F 9/063 414/273 |
| 2016/0129592 | A1* | 5/2016 | Saboo | G06Q 50/28 700/248 |
| 2016/0167880 | A1* | 6/2016 | Pankratov | B65G 1/0492 414/281 |
| 2016/0229631 | A1* | 8/2016 | Kimura | G05D 1/0291 |
| 2017/0088355 | A1* | 3/2017 | Khodl | B25J 5/007 |

* cited by examiner

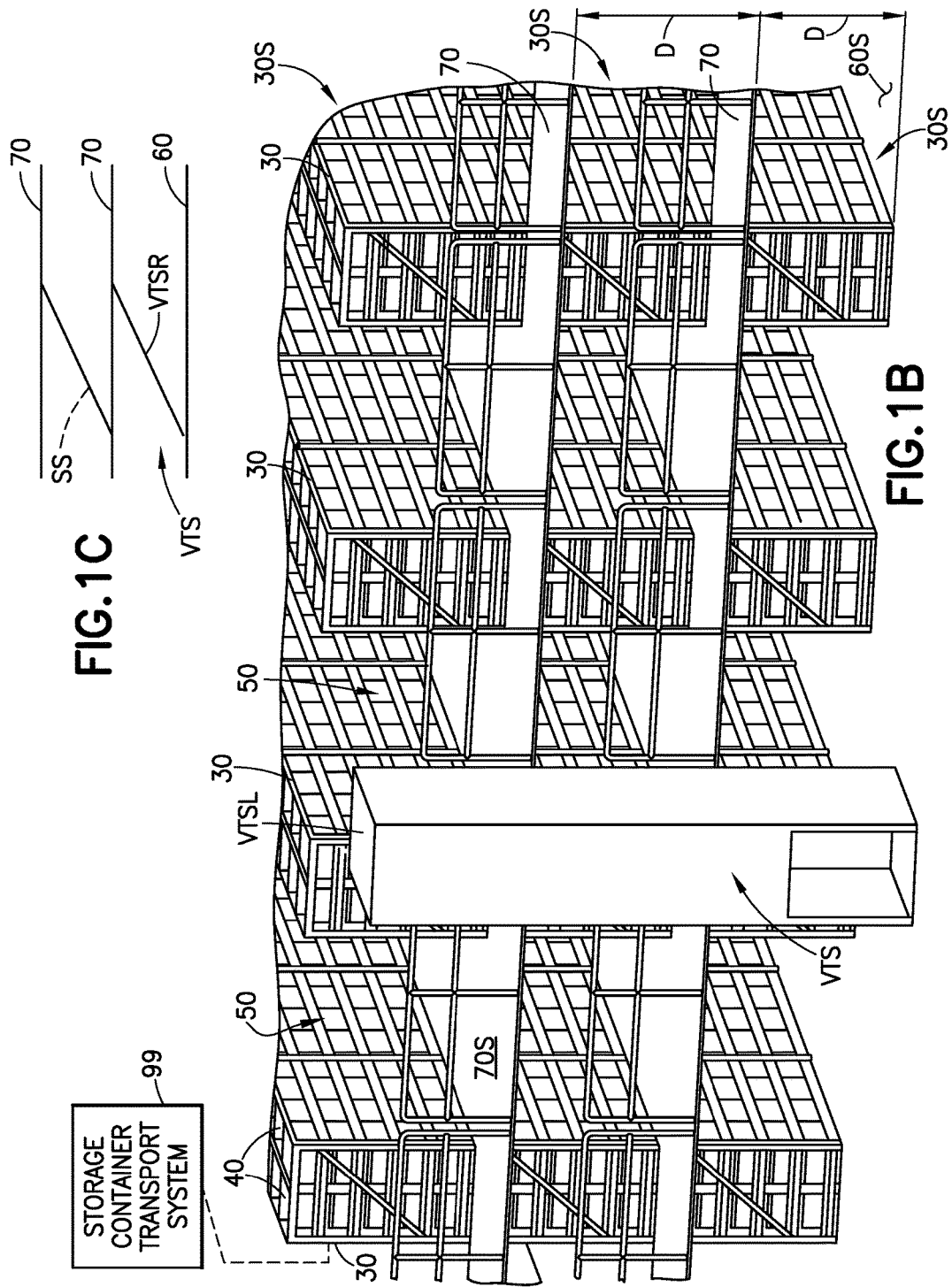

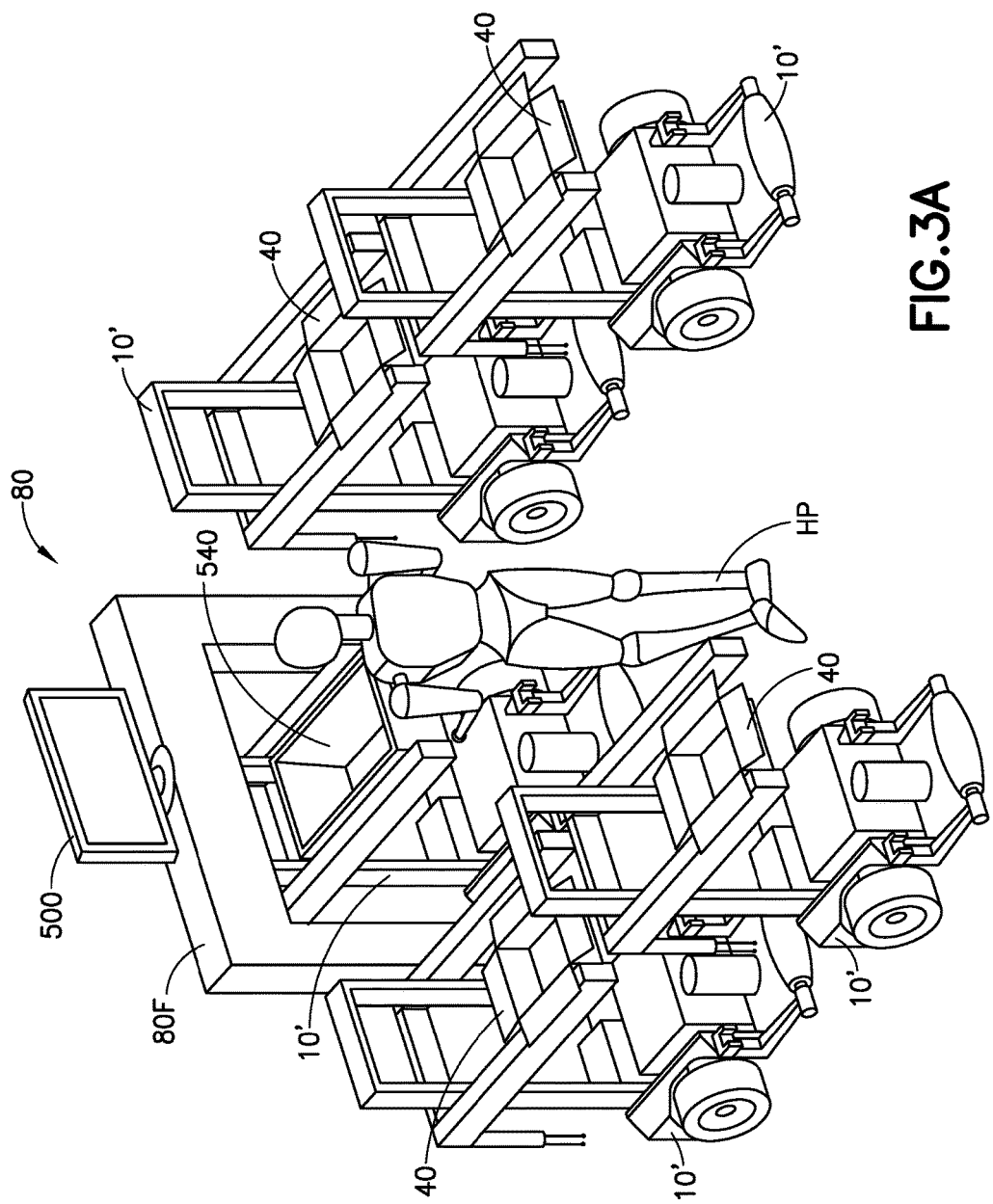

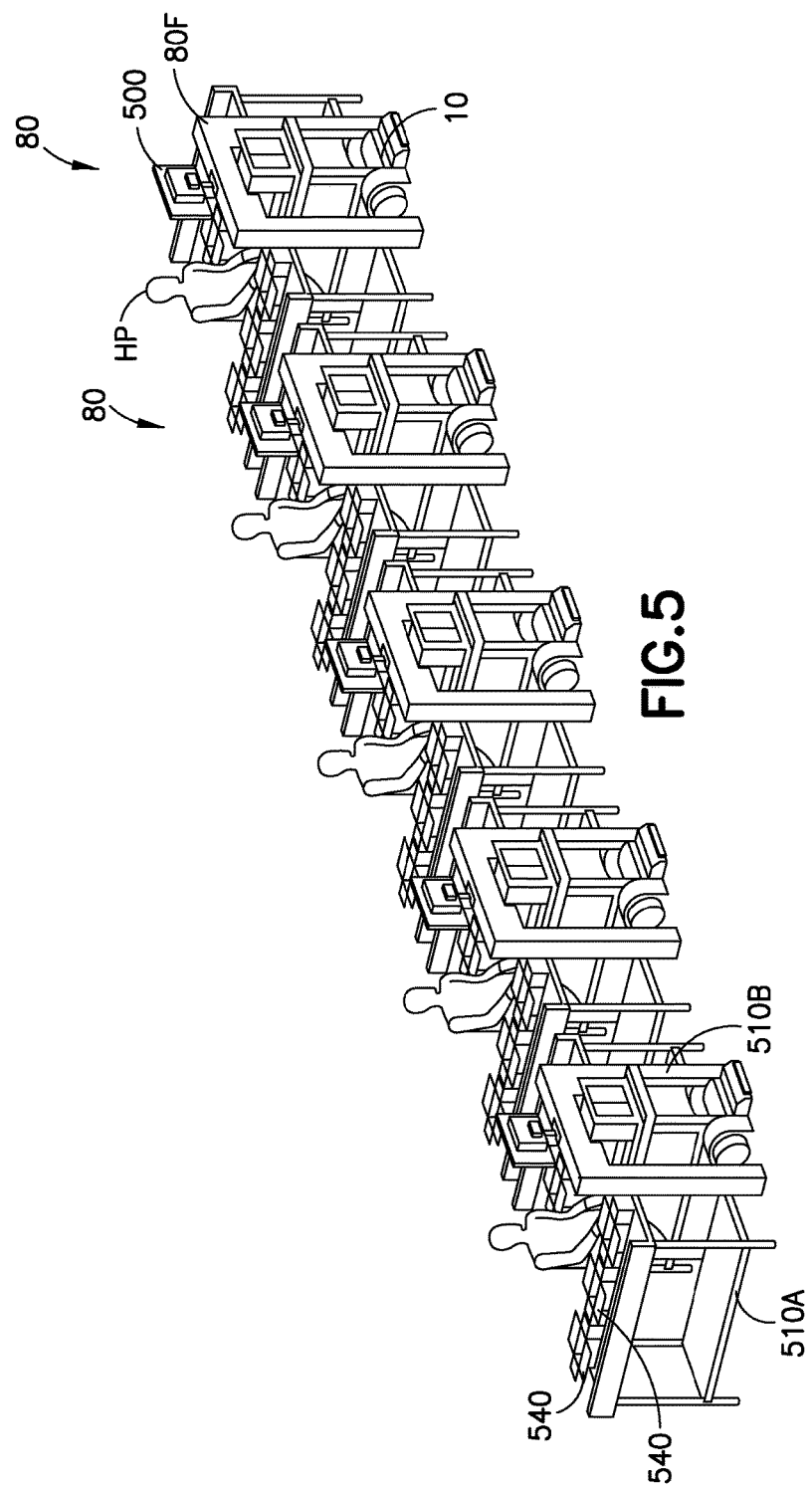

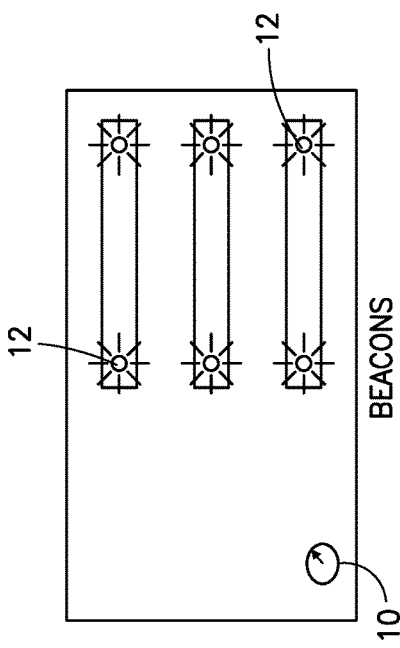
FIG.6 SLAM
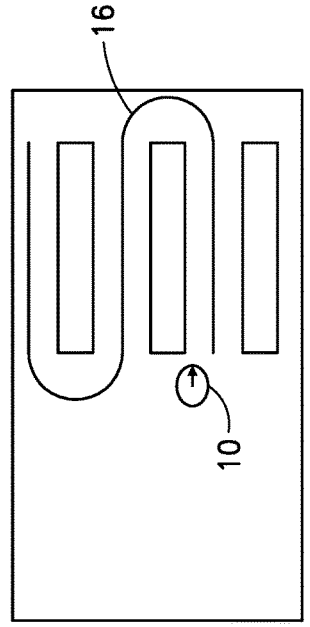
FIG.7 BEACONS
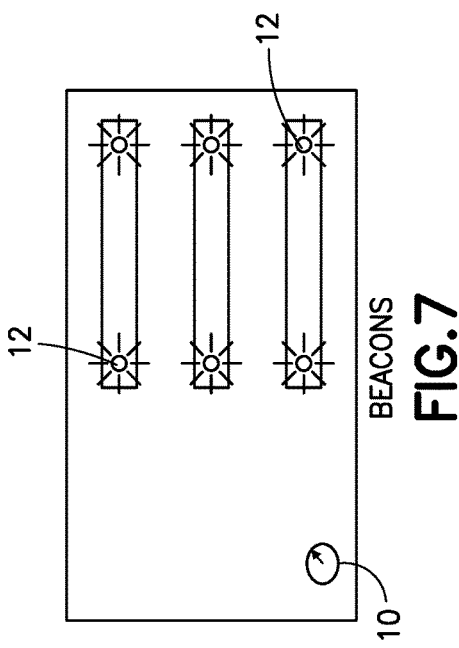
FIG.8 MARKERS+LOCAL BEACONS
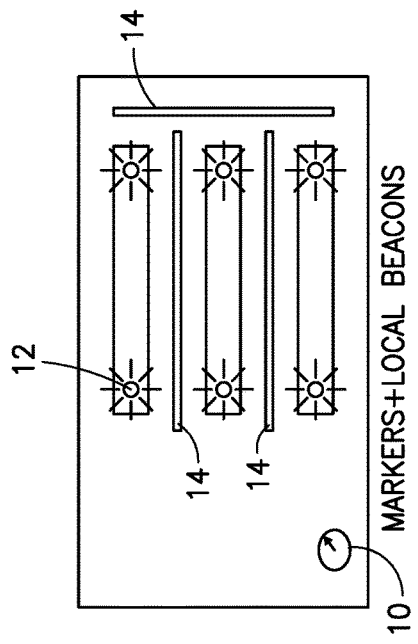
FIG.9 AD HOC ROUTE MARKERS

METHOD AND SYSTEM FOR AUTOMATED TRANSPORT OF ITEMS

CROSS REFERENCE TO RELATED APPLICATION

This application is a non-provisional of and claims the benefit of U.S. provisional patent application No. 62/093,786, filed on Dec. 18, 2014, the disclosure of which is incorporated by reference herein in its entirety.

BACKGROUND

1. Field

The exemplary embodiments generally relate to transportation of items, more particularly, to the automated transportation of items between multiple points.

2. Brief Description of Related Developments

Generally, conventional large scale automated distribution centers that fulfill orders including one or more items (where each item is called an "each" and the picking process of an "each" is referred to as an "each pick") have a customized storage structures in which automated guided vehicles operate. These customized storage structures are generally expensive, require lengthy installation times and are not easily changed or moved once constructed. In addition, the automated guided vehicles operating within the customized storage structures are generally constrained by the walls or other structure of the customized storage structure. As may be realized, the automated guided vehicles pick cases of items from storage locations of the customized storage structure, as specified in an order, and bring the picked items, as needed, to picking stations where a human picker grabs the required number of items from the cases carried by the automated guided vehicles for fulfilling the order. The automated guided vehicles then return the cases of items to the storage locations of the customized storage structure.

Generally there are many conventional automated transportation and storage systems that utilize motorized autonomous transport vehicles to transport products between two or more locations in a warehouse. However, those vehicles may not be fully autonomous in the sense that the customized storage structure contains the automated guided vehicles from leaving the customized storage structure, provides mechanical or other means (e.g. lines on the floor, etc.) of simplifying and/or constraining vehicle motion to one certain areas/directions, and provides alignment between the automated guided vehicle and a product container to make picking/placing of the product container reliable. Those vehicles also may not be safe enough to operate in the presence of humans and/or other equipment, requiring a structure to contain the vehicles or a defined "robot only" area of operation that is away from humans and/or other equipment, decreasing flexibility, efficiency and ease of maintainability/serviceability of the system. As noted above, a customized storage structure that provides these features may be cost prohibitive and may prevent distribution systems from adopting a large scale automated transportation/picking system. These conventional systems may also preclude workers from fulfilling orders using traditional picker-to-goods methods in the same space occupied by the automated guided vehicles in order to best optimize the system for order fulfillment efficiency.

It would be advantageous to have a low cost, retrofitable automated transportation system for transferring items between multiple locations in a distribution center that also allows, if desired, for simultaneous picker-to-goods methods in the same space as the automated transportation system.

BRIEF DESCRIPTION OF THE DRAWINGS

The foregoing aspects and other features of the disclosed embodiment are explained in the following description, taken in connection with the accompanying drawings, wherein:

FIG. 1B is a schematic illustration of a portion of the distribution center of FIG. 1A in accordance with aspects of the disclosed embodiment;

FIG. 1C is a schematic illustration of a portion of the distribution center of FIG. 1A in accordance with aspects of the disclosed embodiment;

FIG. 3A is a schematic illustration of a portion of the distribution center of FIG. 1A in accordance with aspects of the disclosed embodiment;

FIG. 5 is a schematic illustration of a portion of the distribution center of FIG. 1A in accordance with aspects of the disclosed embodiment;

FIG. 6 is a schematic illustration of automated guided vehicle navigation in accordance with aspects of the disclosed embodiment;

FIG. 7 is a schematic illustration of automated guided vehicle navigation in accordance with aspects of the disclosed embodiment;

FIG. 8 is a schematic illustration of automated guided vehicle navigation in accordance with aspects of the disclosed embodiment;

FIG. 9 is a schematic illustration of automated guided vehicle navigation in accordance with aspects of the disclosed embodiment.

DETAILED DESCRIPTION

Figure 1A:
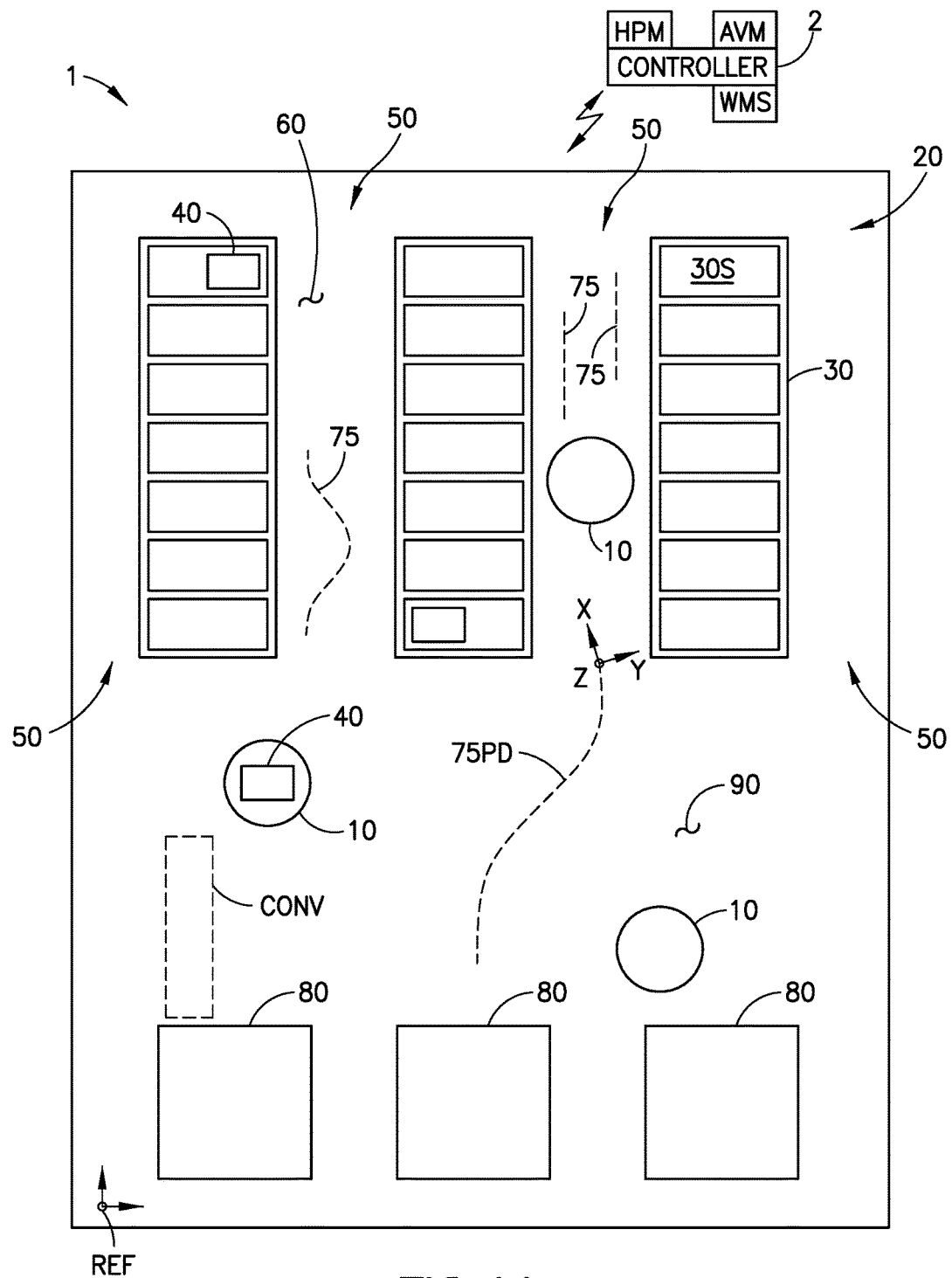
FIG. 1A is a schematic illustration of a distribution center in accordance with aspects of the disclosed embodiment.

FIG. 1A is a schematic illustration of a distribution center or warehouse 1 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

The aspects of the disclosed embodiment described herein provide a system for automating order fulfillment, replenishment, and/or returns in a warehouse 1 without requiring large changes in the physical infrastructure of an existing warehouse 1. The aspects of the disclosed embodiment include one or more automated guided vehicles 10 that pick, place or otherwise move storage containers 40 (which hold any suitable products or goods and are configured for placement in a storage space on a storage rack/shelf) from one place to another within the warehouse 1. In one instance, the aspects of the disclosed embodiment are retrofit to an existing warehouse structure (e.g. the aspects of the disclosed embodiment utilize an existing storage structure which includes at least storage racks with storage spaces and a floor). The automated guided vehicles 10 are deployed in the existing warehouse structure to move throughout the warehouse 1 for moving the storage containers 40 according to instructions from any suitable controller 2 that is in communication with the automated guided vehicles 10 in any suitable manner (such as for example, through a wireless or wired communication connection). The automated guided vehicles 10 are deployed on a single level of the warehouse 1 (as illustrated in FIG. 1A) or on multiple levels of the warehouse 1 where mezzanine platforms 70 are connected to the existing warehouse structure to form the multiple levels (as illustrated in FIG. 1B). Automated guided vehicle access to each of the multiple levels, as will be described in greater detail below is provided through an automated guided vehicle vertical transport system. In other aspects, the vertical transport system could be used to only move the storage containers 40 between levels where containers 40 are transferred between the automated guided vehicles 10 and the vertical transport system. In another instance the aspects of the disclosed embodiment are implemented during construction of a new warehouse so that automation of the existing or new warehouse is achieved with common low cost structures compared to conventional automated warehouse systems having customized storage structures.

As can be seen in FIG. 1A the warehouse 1 includes a storage array 20 including one or more stacked racks 30. Each of the stacked racks 30 includes one or more (e.g. at least one) storage locations positioned on the rack in a predetermined location (e.g. predetermined storage locations 30S) such that each of the predetermined storage locations 30S is configured to hold or store at least one storage container 40. The one or more stacked racks 30 are arranged so as to form aisles 50 between the racks 30 where the predetermined storage locations 30S (and hence the storage containers 40) are arranged along the aisles 50.

Referring also to FIG. 1B, each of the aisles 50 includes a base or floor 60. One or more mezzanine platforms 70 are disposed above the floor 60 and are connected to the stacked racks 30 in any suitable manner (e.g. by mechanical fasteners, clips, etc.) such that at least the stacked racks support the mezzanine platforms 70. In other aspects, columns or other support structure are provided for supporting the mezzanine platforms 70. The mezzanine platforms 70 are spaced apart from each other and with the floor by a distance D to form multiple levels of storage and to provide human picker access to the predetermined storage locations 30S of each of the racks 30 along the one or more aisles 50. In other words the levels of storage or mezzanines 70 are separated by a height D that makes human access into at least the aisles 50 of each level of storage comfortable for manual picker-to-goods order fulfillment tasks (e.g. a human picking goods from storage containers located substantially directly in the storage spaces 30S) and for servicing or maintaining one or more of the automated guided vehicles 10 located within the rack array 20. As will be described in greater detail below, the one or more automated guided vehicles 10 are provided and configured to traverse the floor 60 and the one or more mezzanine platforms 70 to access each of the predetermined storage locations 30S of the storage array 20. As will also be described in greater detail below the one or more automated guided vehicles 10 are configured to hold and transport one or more storage containers 40 to and from the predetermined storage locations 30S. As may be realized, referring to FIGS. 1B and 1C, any suitable vertical transport system VTS is provided that connects the floor 60 to the mezzanine platforms 70 and that connects the mezzanine platforms 70 to other ones of the stacked mezzanine platforms 70. In one aspect the vertical transport system VTS includes one or more of vertical lifts VTSL and ramps VTSR. In one aspect the vertical lifts VTSL are configured for automated guided vehicle 10 roll on and roll off (in a manner similar to an elevator that stops at each floor to allow the vehicles to roll onto an elevator platform and to roll off of the elevator platform). In other aspects the vertical lifts VTSL have any suitable configuration for transporting the automated guided vehicles 10 and/or the containers 40 between the storage levels formed by the floor 60 and mezzanine platforms 70. In one aspect one or more ramps VTSR having any suitable configuration are provided between the storage levels so that the automated guided vehicles 10 traverse the ramp(s) VTSR between the storage levels. In one aspect each of the ramps VTSR includes a surface SS substantially similar to surfaces 60S and 70S of the floor 60 and mezzanine platforms 70 (as will be described below). In other aspects, the storage containers 40 are transferred from a storage location 30S to a level (such as the floor 60 and/or a mezzanine platform 70) on which the automated guided vehicle 10 is located by a storage container transport system 99 that only moves the storage containers 40. For example, the storage container transport system 99 includes one or more of a ramp, conveyor, lift or any other suitable vertical transport that interfaces with the storage locations 30S for picking and placing storage containers 40 from and to the storage locations 30S and that interfaces with the automated guided vehicles 10 for transferring the storage containers 40 to and from the automated guided vehicles 10. In one aspect the storage container transport system 99 includes any suitable transfer unit for transferring containers 40 to and from the storage spaces 30S while in other aspects the storage spaces 30S/rack 30 include any suitable transfer unit for transferring containers 40 to and from the storage container transport system 99.

The floor 60 and the one or more mezzanine platforms 70, along which the one or more automated guided vehicles 10 travel, each include an undeterministic traverse surface 30S, 70S. The automated guided vehicle 10 is configured, as will be described below, so that the undeterministic traverse service 30S, 70S provides holonomic selectable paths 75 for the automated guided vehicle substantially everywhere on the respective undeterministic traverse surfaces 30S, 70S. Here the term holonomic selectable paths means that any path anywhere on the surface 30S, 70S is substantially equal to each other with respect to the surface 30S, 70S so that the automated guided vehicle 10 is free to select a path everywhere on the surface subject to other parameters such as obstacles, edges or the racks or walls of the warehouse, optimum pathway way points, etc. As will also be described in greater detail below, each of the holonomic selectable paths 75 is freely selectable by the automated guided vehicle 10 and/or a central controller 2 (which is in communication with the automated guided vehicle 10) for traverse along the aisles of the floor 60 and/or mezzanine platforms 70.

Figure 2:
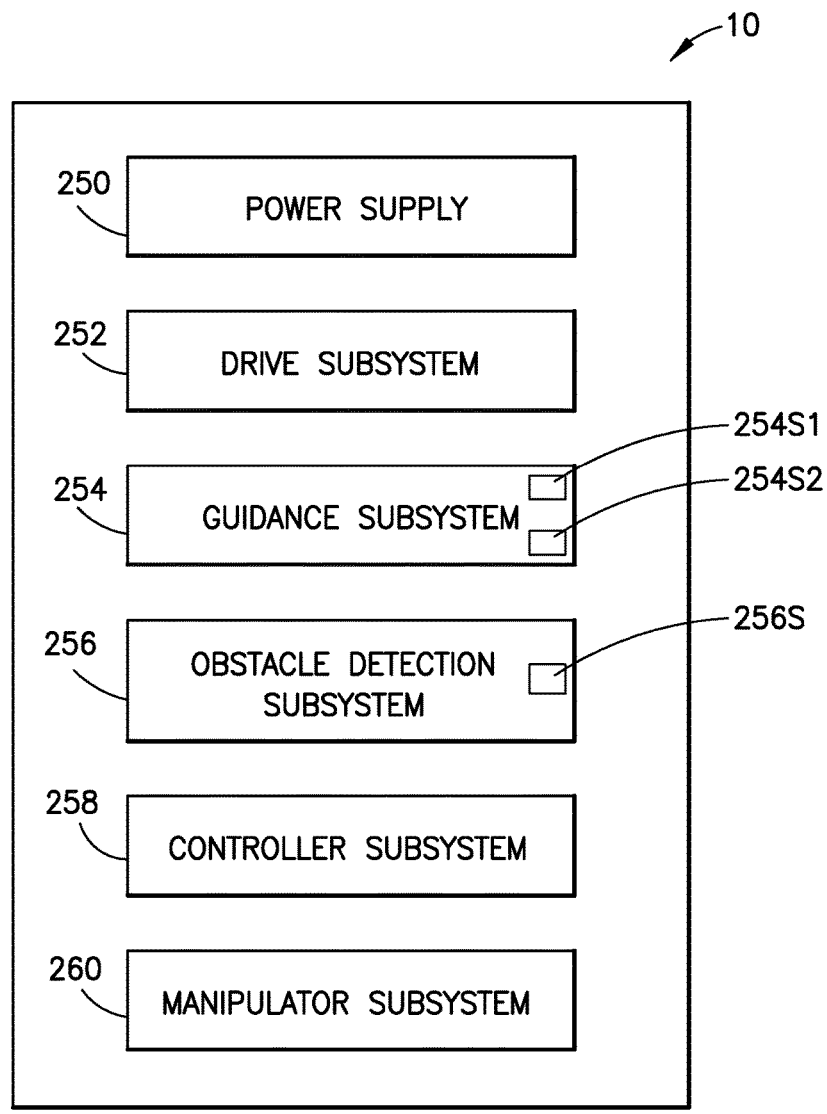
FIG. 2 is a schematic illustration of an automated guided vehicle in accordance with aspects of the disclosed embodiment.
Figure 4:
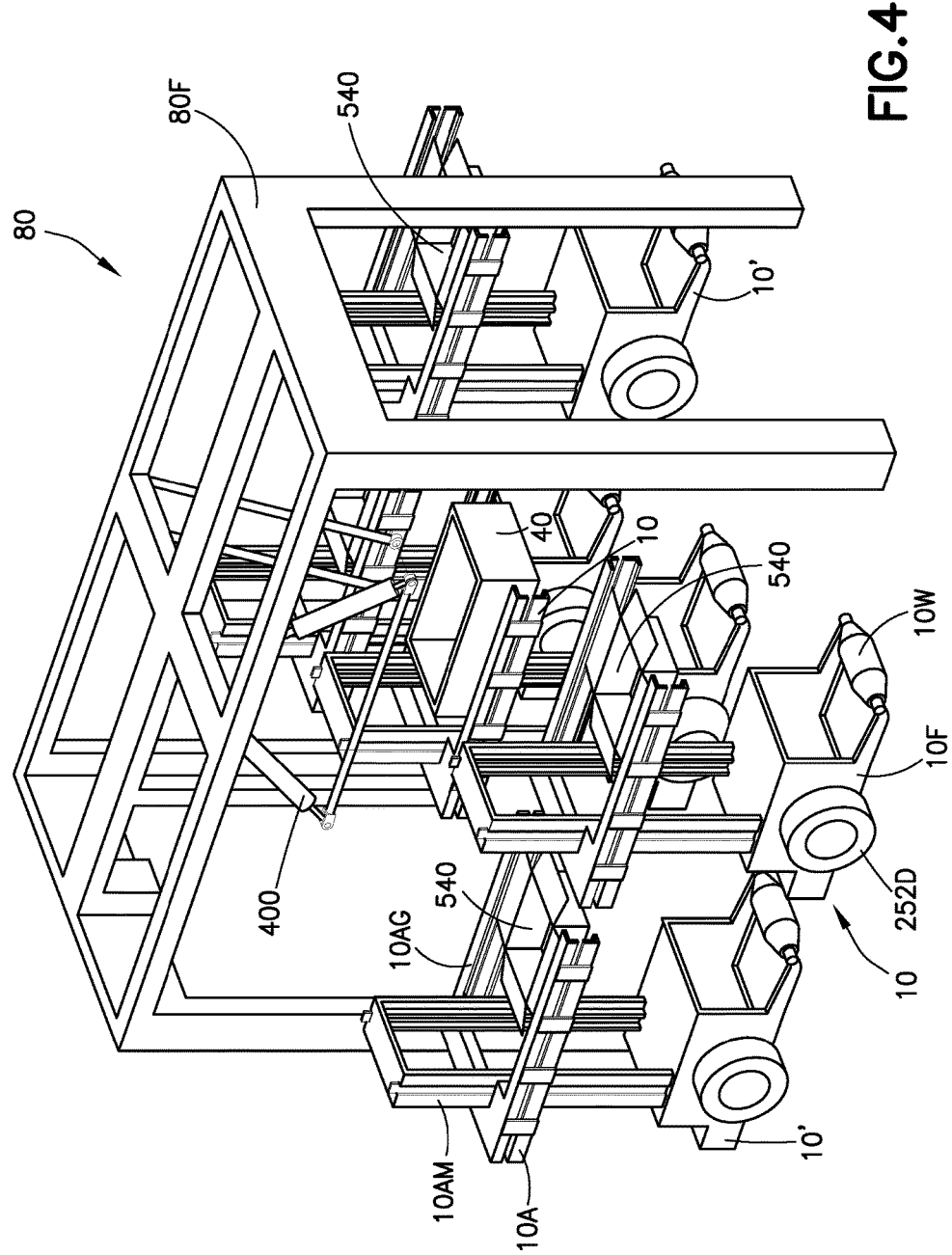
FIG. 4 is a schematic illustration of a portion of the distribution center of FIG. 1A in accordance with aspects of the disclosed embodiment.

Referring now to FIGS. 2 and 4 each automated guided vehicle 10 includes a frame 10F, a plurality of wheels 10W (at least one of which is a drive wheel 252D) and a gripper/manipulator or effector 10A. In one aspect the gripper is movable (e.g. a movable container grip or container manipulator subsystem, see also FIG. 2) that is configured to engage the storage containers 40 so as to pick and place one of the storage containers 40 to and from a storage location 30S on the racks 30. The gripper 10A includes one or more degrees of freedom for effecting transfer of containers 40 to and from the automated guided vehicle 10 at one or more predetermined heights (e.g. such as a height of an order fill station, ergonomic human picker height, storage space height, etc.). In one aspect the gripper 10A includes at least two degrees of freedom for effecting extension of the gripper 10A along for example, a Y axis and a Z axis (e.g. where an X axis of the automated guided vehicle is coincident with a longitudinal path of travel of the automated guided vehicle and the Y axis is transverse to X axis—see FIG. 1A). The automated guided vehicle 10 is, in one aspect configured to extend the gripper 10A along the Y axis for transferring containers to and from the storage spaces 30S while in other aspects, the automated guided vehicle 10 is configured to extend the gripper 10A along the X axis for transferring containers to and from the storage spaces 30S. In one aspect the automated guided vehicle is configured to extend the gripper 10A along the Z axis where the automated guided vehicle 10 moves along one or more of the X or Y axes for at least partially effecting positioning of the gripper 10A relative to the container 40 (e.g. to engage and move the container 40 along one or more of the X and Y axes, in and out of the storage spaces 30S). In one aspects the automated guided vehicle 10 rotates so that the X axis of the automated guided vehicle 10 faces the storage locations 30S. In one aspect the gripper 10A includes a storage container support 10AG configured to pick and hold at least one storage container 40. As may be realized, in one aspect, the automated guided vehicle 10 includes a mast 10AM along which the gripper 10A rides for accessing or otherwise reaching storage containers 40 at all heights on each level of storage (see FIG. 1B where each level of storage includes multiple levels of stacked storage spaces 30S). In one aspect the mast 10AM provides the gripper 10A with a Z axis stroke range that positions a storage container 40 held by the gripper 10A at a human picker upper ergonomic pick and place height so that the human picker picks and places items to and from the storage container 40 (or order fill container) substantially without ergonomic distress. In one aspect each of the storage containers 40 are substantially the same to other ones of the storage containers 40 while in other aspects each of the storage containers 40 is different (e.g. constructed of a different material, has different dimensions, has a different shape, etc.) than at least one other storage container 40. In any event, the gripper 10A is configured to pick and hold the storage containers 40 in any suitable manner.

Each automated guided vehicle 10 also includes a drive subsystem 252, a guidance subsystem 254, an obstacle detection subsystem 256, a controller subsystem 258 and a power supply 250. The subsystems of the automated guided vehicle 10 include sensors, as will be described below, that provide the automated guided vehicle awareness of (e.g. the ability to detect) the environment around the automated guided vehicle 10 so that the automated guided vehicle knows its position and orientation with respect to the warehouse substantially at all times. For example, the automated guided vehicles know their surrounding at a time where the automated guided vehicles receive a command from, for example, the controller 2 for picking and transporting a storage container 40 and prior to navigating. Based on the awareness of its surroundings the automated guided vehicle 10 selects a path 75 based on any suitable optimizing algorithm resident in, for example, controller subsystem 258 of the automated guided vehicle 10 and then iteratively updates the path (e.g. the path is changed from the selected path as needed) based on, for example, information obtained from the automated guided vehicle sensors and any detected obstacles, transients and waypoints.

As may be realized, the sensors provide alignment between the automated guided vehicles 10 and the storage containers 40 and/or storage spaces 30S to or from which a storage container 40 is picked or placed. The sensors also prevent the automated guided vehicle 10 from colliding with other automated guided vehicles 10, warehouse equipment (e.g. such as racks, forklifts, etc.), humans or other obstacles. As may be realized, although humans are not required to be in the storage aisles 50 while the automated guided vehicles 10 are moving storage containers 40 within the aisles 50 and other portions of the warehouse 1, the aspects of the disclosed embodiment do not restrict human access within zones of movement of the automated guided vehicles 10 during operation of the automated guided vehicles 10. The fully autonomous nature of the automated guided vehicles 10 does not require substantially any mechanical structure to contain the automated guided vehicles or in other words, the operation of the automated guided vehicles 10 does not hinder human access to the storage spaces and vice versa (the automated guided vehicles comingle with humans in a common space of the automated storage system).

The power supply is any suitable power supply, such as a rechargeable power supply, configured to provide power to the automated guided vehicle and all of its subsystems 252, 254, 256, 258, 260. The controller subsystem 258 is any suitable control system such as a microprocessor-based controller subsystem configured to control operation of the automated guided vehicle 10 in performing programmed behaviors such as those described herein. The controller subsystem 258 is configured (e.g., programmed) to perform various functions, including effecting the transport of items with the automated guided vehicle 10 between endpoints. The controller subsystem 258 is connected to and responsive to the output of guidance subsystem 254 and the output of obstacle detection subsystem 256. The controller subsystem 258 controls the drive subsystem 252 to maneuver the automated guided vehicle 10 (as described herein) to prescribed endpoint locations such as one or more predetermined storage spaces 30S and order filling station 80. The controller subsystem 258 is also connected to a manipulator subsystem 260 (of which the gripper 10A is a part of) such that the manipulator subsystem 260 is commanded by the controller subsystem 258 to pick or place a container 40 with the gripper 10A from any suitable container holding location. The controller subsystem 258 is connected to the controller 2 in any suitable manner such as through a wired or wireless connection for receiving storage container picking/placing and transport commands from the controller 2. For example, in one aspect the controller 2 includes warehouse management system WMS configured to receive orders and to identify storage containers 40 (that include products associated with the orders) and the corresponding storage locations 30S for the identified storage containers 40. In one aspect the controller 2 also includes, or is otherwise connected to, an automated guided vehicle manager AVM that is configured to command the automated guided vehicles 10 so that the automated guided vehicles 10 traverse the floor 60 and/or mezzanine platform(s) 70 to the corresponding storage locations 30S for picking at least one of the identified storage containers 40. In one aspect, the automated guided vehicle manager AVM is in communication with the automated guided vehicles in any suitable manner, such as a wired or wireless connection. As may be realized, in response to a command from the controller 2 (or automated guided vehicle manager AVM) the automated guided vehicles 10 generate respective selected paths on the undeterministic traverse surface(s) 60A, 70S that corresponds to the storage location 30S of the identified storage container 40 (e.g. one automated guided vehicle is commanded to pick or place at least one identified storage container) by selecting from the holonomic selectable paths 75. As will be described below, the respective selected path is modified as by the automated guided vehicle 10 depending on a sensing or detection of transient features affecting the selected path so that changes to the selected path are effected. In one aspect, the controller 2 also includes an automated human picker manager HPM communicably connected with at least one human picker HP. The automated human picker manager HPM is in communication with the automated guided vehicle manager AVM and is configured to command the at least one human picker to work in concert with the at least one autonomous guided vehicle 10 in any suitable manner such as described in, for example, U.S. provisional patent application No. 62/063,825 filed on Oct. 14, 2014 and entitled "Storage Material Handling System", the disclosure of which is incorporated herein by reference in its entirety.

The drive subsystem 252 is mounted to the frame (and which includes wheels, at least one of which is a drive wheel) for maneuvering the frame 10F (and hence the automated guided vehicle 10). In one aspect the drive subsystem 252 is a differential drive system having two independently operable coaxial drive wheels 252D and at least one roller wheel 10W for balance or support of the frame 10F. The drive wheels 252D are driven together or independently by one or more motors and any suitable drive transmission controlled by, for example, the controller subsystem 258. In other aspects, the drive subsystem 252 includes steered wheels or any other suitable drive configuration for effecting movement of the automated guided vehicle 10 through the warehouse 1.

The guidance subsystem 254 is mounted to the frame 10F for interacting with the drive subsystem 252 and is configured to effect navigation of the automated guided vehicle 10 in any suitable manner such as those described in U.S. Pat. No. 8,676,425 and U.S. patent application Ser. No. 13/285,511 filed on Oct. 31, 2011 the disclosures of which are incorporated herein by reference in their entireties. Referring also to FIG. 6, in one aspect the guidance subsystem includes a simultaneous location and mapping (SLAM) navigation system that provides the automated guided vehicle 10 a global coordinate or reference frame REF with respect to the warehouse 1. Here the automated guided vehicle guidance is effected through a coordinate system that lacks physical markers or beacons.

Referring also to FIGS. 7-9, in one aspect, the guidance subsystem 254 includes one or more of a marker detecting sensor(s) 254S1 and/or a beacon sensor(s) 254S2. In one aspect the marker detecting sensor(s) 254S1 are configured to detect the position of a marker such as a retro-reflective tape (or other suitable marker such as a capacitive or inductive marker or other optical marker including but not limited to barcodes) laid on the floor 60 (e.g. on the undeterministic traverse surfaces 60S), on the mezzanine platform 70 (e.g. on the undeterministic traverse 70S) and/or on any other suitable surface such as the walls of the warehouse 1 and/or on the racks 30. In one aspect the marker detecting sensor(s) 254S2 include one or more of a photo-diode-based sensor, one or more radiation sources (e.g., LEDs), inductive sensors, capacitive sensors, barcode reader, etc. to detect the marker. In one aspect the beacon sensor 254S2 includes any suitable transmitter and/or receiver configured to actively or passively detect any suitable radio frequency beacons 12 (or other suitable beacon such as an infrared, laser or other optical beacon). As can be seen in FIG. 7, for example, the guidance subsystem 254 includes a plurality of active (e.g. having a radio frequency or other (e.g., infrared) beacon transmitter) or passive (e.g. configured to passively return a signal) beacons or tags 12 that are located at any suitable location of the warehouse 1 (such as on the racks, on walls, on the floor 60, on the mezzanine platform 70, ceiling, etc.). In this case, the beacon sensor(s) 254S2 are configured to detect signals from beacons or detect the beacons themselves for locating the automated guided vehicle 10 relative to the storage spaces 30S, the racks 30, the order filling stations 80 and any other suitable structure of the warehouse 1. By way of example, where beacons 12 are used, each automated guided vehicle 10 should secure a line of sight to one or more beacons 12, for example, an origin and/or destination beacon could be visible (either optically or through radio waves) to the automated guided vehicle 10 for at least a period of time. The automated guided vehicle 10 moves directly from one beacon (e.g. the origin beacon) toward the other (e.g. the destination beacon) unless an obstacle intervenes as described herein. In one aspect each beacon 12 establishes a respective coordinate system, where the beacon is the origin of the respective coordinate system. Angular encoding (or any other suitable encoding) is employed to specify the axes of the beacon coordinate system. The beacon coordinate system enables robots to queue along a particular ray whose origin is the beacon. Angle encoding can also enable other useful properties.

Referring to FIG. 8, in one aspect, the guidance subsystem 254 includes shorter range active or passive beacons 12 (which are substantially similar to those described above) and pathways established by any suitable markers 14 (such as those described above) attached to, for example, the floor and/or other suitable surface (e.g. walls, racks, etc.) so that the automated guided vehicles are provided with a rough global reference frame REF. Here the beacon 12 and marker 14 arrangement simplifies sensor range requirements compared to SLAM navigation. Referring also to FIG. 9 the guidance subsystem 254 includes, in one aspect, an ad hoc marker system including one or more markers 16 laid on the floor and/or other suitable surface (e.g. walls, racks, etc.), in some cases temporarily. A route marker 14 indicating an automated guided vehicle 10 path is employed in situations where either a line of sight between beacons does not exist or traveling in a straight path between beacons is not desired. For example, a route marker enables an automated guided vehicle 10 to avoid a ditch at a construction site. As may be realized, the automated guided vehicle 10 can illuminate, for example, a tape or line using, e.g., conventional IR LEDs. In aspect the automated guided vehicle 10 detects the tape or line using a position-sensitive detector composed of discrete components (i.e., not a camera) to servo on the tape or line. The detector measures the degree of retro-reflectivity in view to eliminate false positives. In one aspect, the automated guided vehicle 10 servo on the line directly. In one aspect, the automated guided vehicle 10 can servo at any selected offset with respect to the line. Offset servoing enables two important properties. When placing the line to mark the automated guided vehicle 10 path, workers need not allow space between line and objects. Any time the automated guided vehicle 10 finds its path partially blocked by an object, the automated guided vehicle 10 will increase its offset from the line so that it can follow the line without colliding with the object. A second feature enabled by offset following allows two automated guided vehicles 10 that meet while traveling along the line in opposite directions to avoid collision. When the automated guided vehicles 10 determine that a collision is imminent, each can offset its position relative to the line. The automated guided vehicles 10 can thus pass without obstructing each other.

As may be realized, in one aspect the automated guided vehicle employs one or more of the navigation system described herein for navigating the warehouse 1 and transporting storage cases 40 from one location to another. In other aspects, the automated guided vehicles include any suitable locating system, such as internal GPS that locates the vehicle within the warehouse 1 space such that an automated guided vehicle 10 and/or controller 2 knows where the location and pose of automated guided vehicle 10 within the warehouse 1 as desired.

Referring again to FIG. 1A, in one aspect, the automated guided vehicle is configured for navigation and path selection using one or more of the holonomic selectable paths 75 described above. For example, the controller subsystem 258 and/or controller 2 is configured to select one or more of the paths 75 based on parameters such as obstacles, edges or the racks or walls of the warehouse, optimum pathway way points, etc. It is noted that where the controller 2 selects the initial path 75 the controller 2 sends any suitable commands to the automated guided vehicle 10 to follow the initially selected path 75. In one aspect, the automated guided vehicle maintains or modifies the initially selected path 75 by selecting other paths from the holonomically selectable paths available based on, for example, transient obstacles or other information indicating the initially selected path 75 is blocked or otherwise inaccessible. For example, the automated guided vehicle 10 may move to another minimally offset path offset from the originally selected path to avoid a transient obstacle. In one aspect, referring also to FIG. 2 the controller subsystem 258 is connected to an obstacle detection subsystem 256 of the automated guided vehicle 10. The obstacle detection subsystem 256 includes one or more optical, capacitive, inductive, etc. sensors 256S configured to detect other robots and obstacles (e.g. such as walls, racks, human pickers, etc.) within the warehouse 1. In one aspect the sensor 256S includes an active IR emitter on one automated guided vehicle 10 that is detected by a receiver on another automated guided vehicle 10. The components of this system on the two automated guided vehicles 10 is arranged such that the following automated guided vehicle 10 detects the automated guided vehicle 10 in front only when the two are physically close. In one aspect, the obstacle detection subsystem 256 includes one or more range sensors to detect transient features affecting path 75 passage where such transient features include but are not limited to other robots, humans and obstacles. In one aspect, the range sensor(s) is a wide-angle (120 degree) range sensor. Raw range sensor data (in the form of a list of angle and range readings) supplied by the sensor is registered with and processed by a computer processor (e.g., a processor in the controller subsystem 258) to return the position of the other robots, humans and obstacles. In response to the sensor data received from the obstacle detection subsystem 256 the controller subsystem 258 is configured to command (e.g. based on the path optimization algorithm noted above) the drive subsystem 252 so that the automated guided vehicle selects paths 75 (e.g. changes path from a selected path) that are unobstructed for transporting one or more storage containers 40 from one point to another. For exemplary purposes only, in one aspect a predetermined automated guided vehicle path 75PD (which in one aspect is one of the holonomic selectable paths 75) is defined by any suitable waypoints (e.g. coordinates, markers, beacons, etc.) between each of the order filling stations 80 and each of the aisles 50 where the automated guided vehicles 10 are instructed by the controller subsystem 258 to follow the predetermined automated guided vehicle path 75PD unless there is an obstruction in the path 75PD. Where there is an obstruction in the path (e.g. as detected by the obstacle detection subsystem 256) the controller subsystem 258 selects any one of the holonomic selectable paths 75 to avoid the obstacle and continue to a predetermined destination (e.g. storage location 30S, order filling station 80, etc.).

Referring to FIGS. 1 and 3-5 the warehouse 1 also includes one or more order filling stations 80. As will be described in greater detail below, the automated guided vehicles 10 transport the storage containers to and from the order filling stations 80 so that one or more goods are picked from the storage containers (e.g. at the order filling stations 80) to fill an order. The order filling stations 80 are connected to the surface 60S, 70S of the floor 60 and mezzanine platforms 70 by an automated guided vehicle access way 90 which includes a surface that is substantially similar to surfaces 60S, 70S and also provides the holonomic selectable paths along which the automated guided vehicles 10 travel.

Referring to FIG. 5, each order filling station 80 includes a frame 80F configured so that, in one aspect, a storage container 40 (e.g. a source container from which goods or SKUs are picked) carried by an automated guided vehicle 10 is positioned at least partly within the frame (e.g. at the human picker upper ergonomic pick and place height) to allow a human picker HP to at least pick goods or products from the storage container 40. It is noted that where a human picker HP transfer goods at the order filling station 80 the order filling station 80 is be referred to herein as a manual fill station. One or more tables or order fill container supports 510A, 510B are disposed agent to or integrally formed with the frame 80F so as to support one or more order fill containers 540 (e.g. an order container into which goods or SKUs are placed for order fulfillment) at the human picker upper ergonomic pick and place height. As may be realized, the tables 510A, 510B and the frame 80F are arranged so that the human picker is substantially centrally located between the storage container 40 and the one or more order fill containers 540. Any suitable picking indicator 500 is provided to instruct the human picker HP of, for example, which goods and how many of the goods are to be picked and into which order fill containers 540 the goods are to be placed. As may be realized, after the human picker HP picks the required goods from the storage container 40, the automated guided vehicle 10 carrying that storage container 40 moves away from the order filling station 80 so that a new automated guided vehicle 10 with a different storage container 40 takes its place thereby providing the human picker HP with a continuously changing selection of goods or SKUs that are needed for fulfilling orders. As may also be realized, the order filling stations 80 are arranged in any suitable positions relative to each other and to the storage spaces that facilitates at least automated guided vehicle transport of storage containers 40 (which as described above are configured for insertion and removal from storage spaces of a shelf) between each of the order filling stations 80 and the storage spaces 30S.

Figure 3:
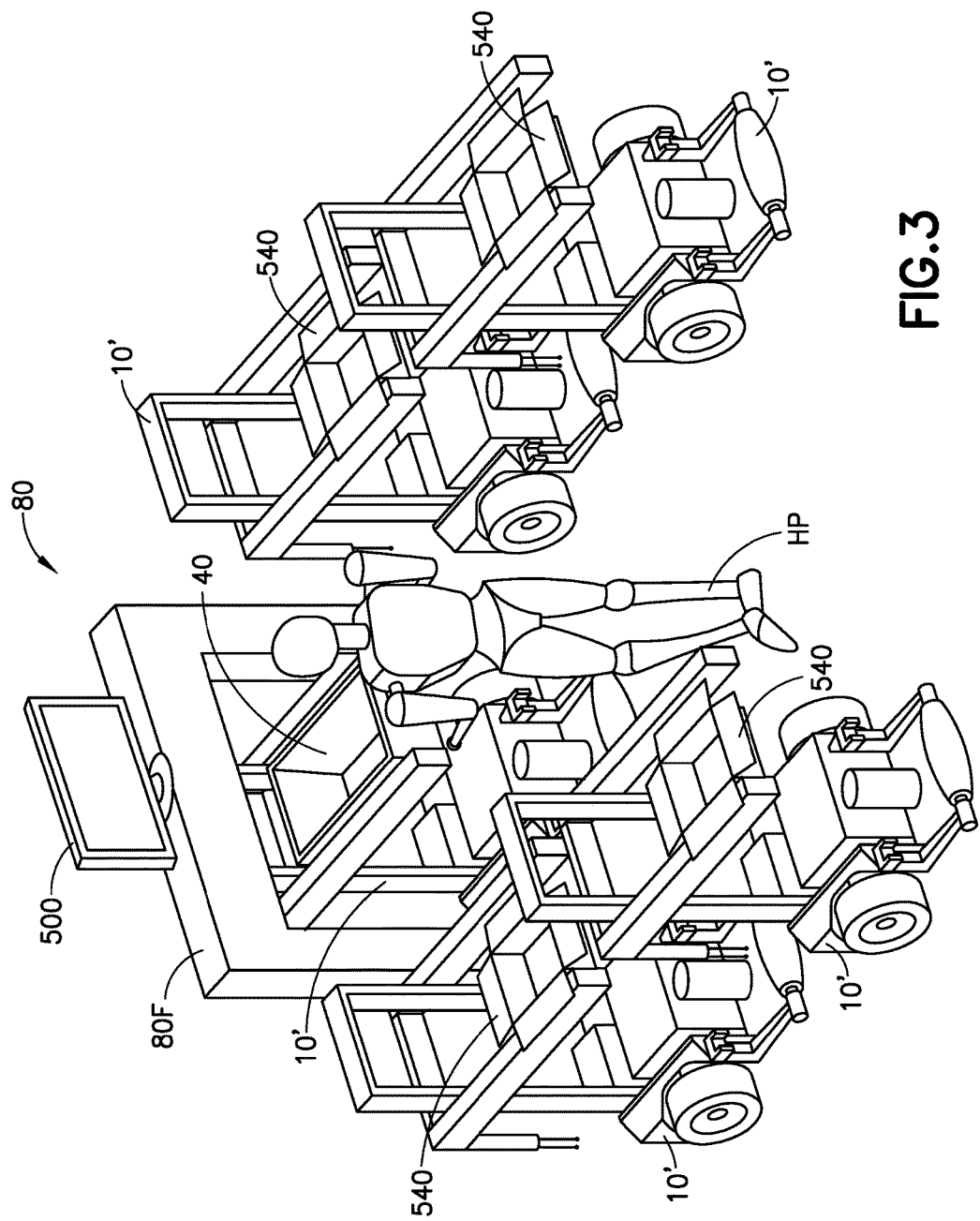
FIG. 3 is a schematic illustration of a portion of the distribution center of FIG. 1A in accordance with aspects of the disclosed embodiment.

Referring to FIG. 3, in one aspect the tables 510A, 510B are replaced with one or more automated guided vehicles 10' (which are substantially similar to automated guided vehicles 10) that support order fill containers 540 at the human picker upper ergonomic pick and place height. In this aspect, the human picker HP picks goods from a common storage container 40 for placement into multiple order fill container 540. Here the automated guided vehicles 10' (e.g. once one or more goods are transferred into the order fill container at the order filling station 80) wait at the order filling stations for additional goods to be placed in the order fill container (e.g. such as the next SKU to arrive at the order filling station), transport an order fill container to a shipping station (e.g. where the order fill containers are one or more of sealed, placed on pallets, loaded onto a shipping vehicle, etc.) or to another order filling station 80 for the receipt of additional goods (e.g. other SKUs) into the order fill container 540.

As may be realized, referring to FIG. 3A, in one aspect the locations of the storage container 40 and the order fill containers 540 are reversed. For example, the automated guided vehicles 10' each support a storage container 40 and the automated guided vehicle 10 supports an order fill container. Here the human picker HP picks goods or SKUs from the storage containers 40 held on the automated guided vehicles 10' for placing multiple SKUs into the order fill container held by automated guided vehicle 10. In other words goods are picked from a plurality of storage containers 40 and placed into a common order fill container 540 at the order filling station 80. Here after the human picker HP picks items from an automated guided vehicle's storage container 40, the automated guided vehicle 10 moves away from the order filling station 80 so that a new automated guided vehicle 10 with a different storage container 40 takes its place thereby providing the human picker HP with a continuously changing selection of containers 40 each holding the same goods or SKUs that are needed for fulfilling orders (e.g. one container holds one or more pieces of a first item, one container holds one or more pieces of a second different item, etc.).

Figure 4A:
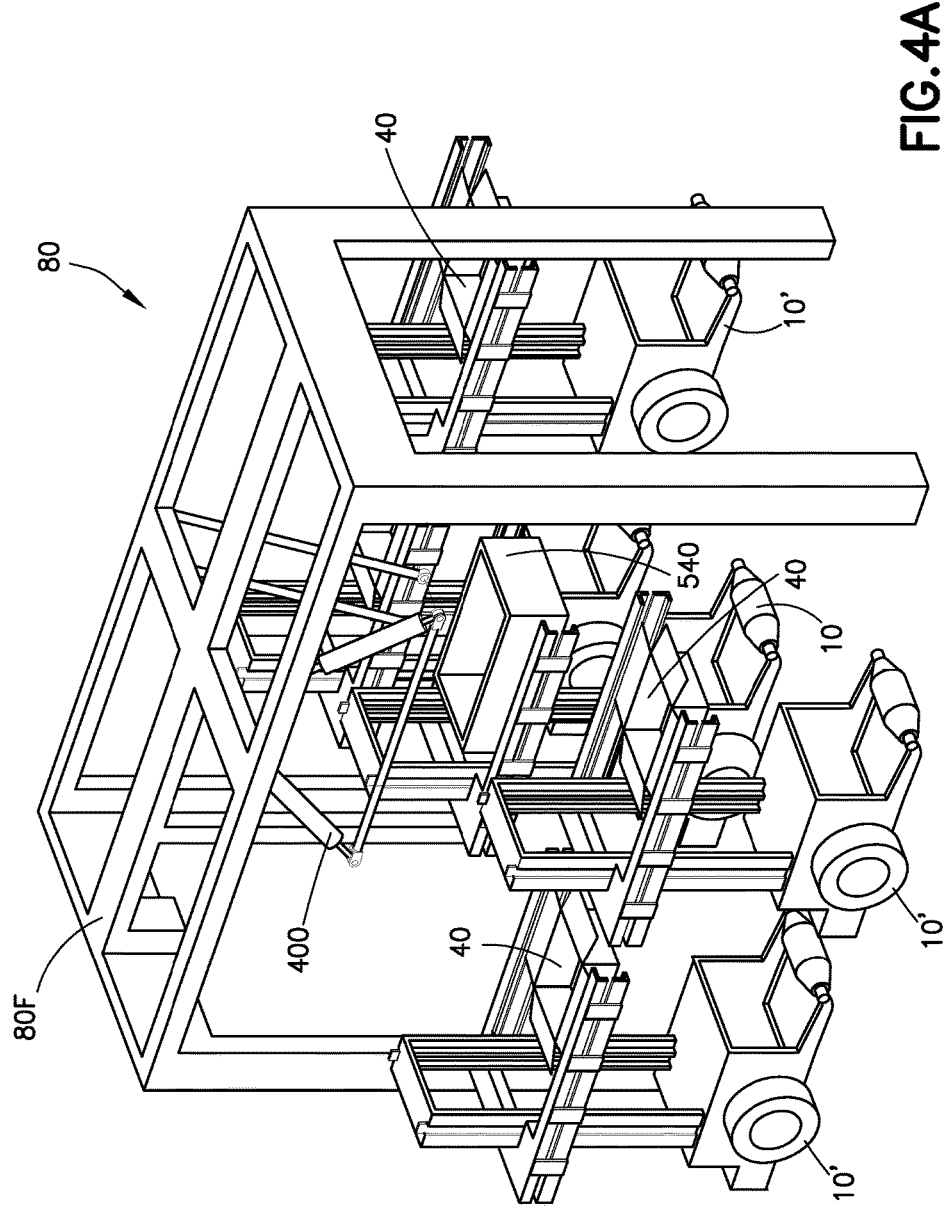
FIG. 4A is a schematic illustration of a portion of the distribution center of FIG. 1A in accordance with aspects of the disclosed embodiment.

Referring to FIGS. 4 and 4A, in one aspect the human picker HP is replaced with an automated pick/place robot 400 mounted to, or otherwise connected to, the frame 80F to form an automatic fill station. The pick/place robot 400 is any suitable transfer robot configured to pick goods from one container for placement in another container. The pick/place robot 400 is connected to the controller 2 in any suitable manner, such as through a wired or wireless connection, for receiving pick/place commands effecting the transfer of goods for order fulfillment at the order filling stations 80. As may be realized, FIG. 3A illustrates the pick/place robot 400 transferring multiple goods from a common storage container 40 for placement into multiple order fill containers 540 in a manner similar to that described above with respect to the human picker HP. Similarly, FIG. 4A illustrates the pick/place robot 400 transferring multiple goods from multiple storage containers 40 for placement into a common order fill container 540 in a manner similar to that described above with respect to the human picker HP. As may be realized, the inclusion of a pick/place robot 400 in the order filling station 80 provides a completely automated picking system with little or no need for human intervention. In addition, any conveyors that are typically used to move containers around and through a robotic picking cell are replaced entirely or at least in part with the automated guided vehicles 10.

As may be realized, once goods are removed from the storage containers 40 at the order filling stations 80 the automated guided vehicles 10 are configured to (or otherwise instructed to by, for example, controller 2) return the storage containers to a storage space 30S (e.g. when goods remain in the storage container). In one aspect, the storage container 40 is returned to the storage space 30S from which it was picked while in other aspects the storage container 40 is returned to a different storage space 30S that is different from the storage space from which the storage container 40 was picked. In one aspect the automated guided vehicles 10 are configured to (or otherwise instructed to by, for example, controller 2) place an order fill container 540 loaded at the order filling station 80 to a storage space 30S in the array 20 rather than transport the order fill container to a shipping station or to another order filling station 80.

Figure 10:
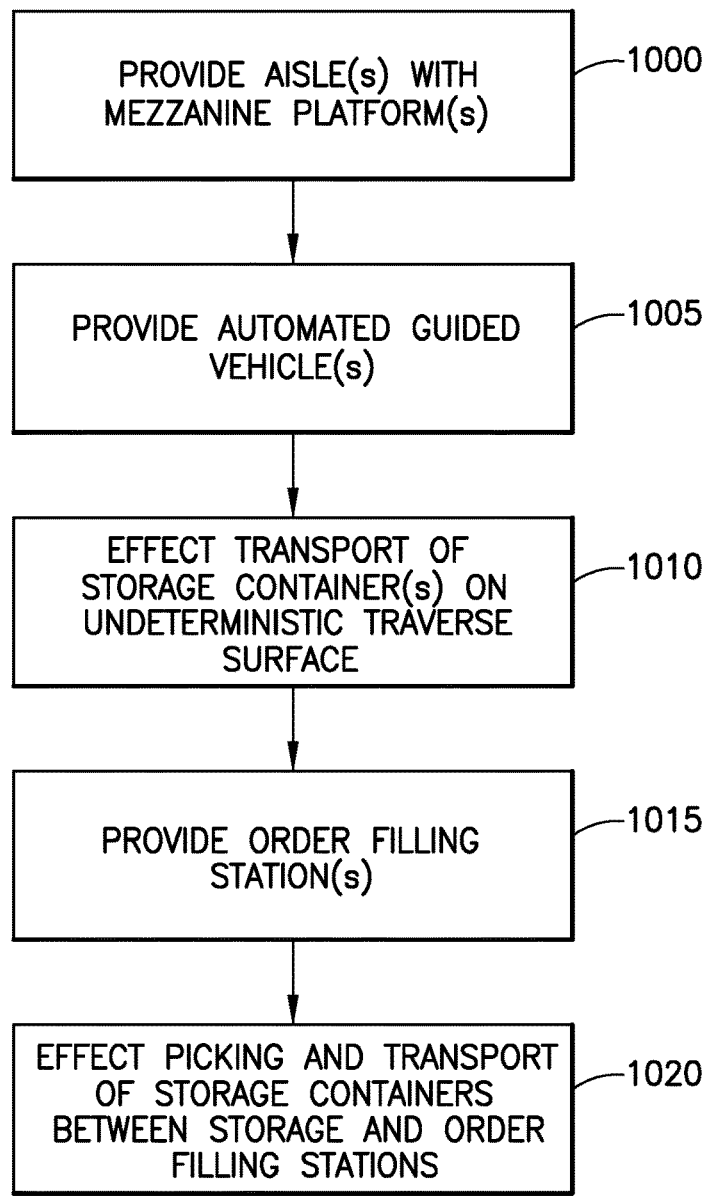
FIG. 10 is a flow diagram in accordance with aspects of the disclosed embodiment.

Referring now to FIGS. 1A, 1B and 2 an exemplary operation of the automated distribution center described herein (e.g. that includes storage array 20 including stacked racks 30 with predetermined storage locations 30S that are arranged along at least one aisle 50 having a floor 60) is provided. In one aspect, at least one of the aisles 50 is provided with at least one mezzanine platform 70 above the floor 60 (FIG. 10, Block 1000) where the floor 60 and the mezzanine platform allow human picker HP access to the predetermined storage locations 30S of the racks 30 along the at least one aisle 50 however, it is noted that in other aspects (as illustrated in FIG. 1) the automated distribution center includes a single level (e.g. floor 60). At least one automated guided vehicle is provided (FIG. 10, Block 1005) where the at least one automated guided vehicle is configured for traverse of the floor 60 and/or the mezzanine platform 70 for accessing the predetermined storage spaces 30S and is configured for holding and transporting one of the storage containers 40 to and from the storage locations 30S in a manner substantially similar to that described above. Transport of the storage containers is effected with the at least one automated guided vehicle (FIG. 10, Block 1010), in a manner substantially similar to that described above, on an undeterministic traverse surface 60S, 70S of each of the floor 60 and mezzanine platform 70 where the undeterministic traverse surface 60S, 70S provides holonomic selectable paths 75 for the at least one automated guided vehicle 10 substantially everywhere on the undeterministic traverse surface 60S, 70S and each of the paths 75 is freely selectable by the at least one automated guided vehicle 10. At least one order filling station is provided (FIG. 10, Block 1015) where one or more goods are picked from the storage containers to fill an order. In one aspect, picking and transporting of the storage containers is effected with the at least one automated guided vehicle 10 (FIG. 10, Block 1020) from one of the storage locations 30S to the order filling station where the at least one automated guided vehicle traverses the undeterministic traverse surface 60A, 70S. For example, upon receipt of an order from the controller 2, the automated guided vehicle 10 traverses to the storage space 30S within the storage array 20 where a predetermined storage container 40 (e.g. needed to fulfill the order) is located. The automated guided vehicle 10 picks the predetermined storage container 40, which contains one or more stock keeping units (e.g. SKUs or goods). The automated guided vehicle 10 is commanded, by for example controller 2 or controller subsystem 258, to transport the predetermined storage container 40 to a predetermined order filling station 80 where a human picker HP or an automated robot 400 (see e.g. FIGS. 3 and 4) is instructed in any suitable manner (such as described above) to pick a certain number of goods from the predetermined storage container 40 and place those goods into one or more order fill containers 540 disposed adjacent the picker HP or robot 400. It is noted that the order fill containers 540 are, in one aspect, substantially similar to the storage containers 40 while in other aspects the order fill containers 540 are any suitable container configured for the shipping/transport of goods using any suitable transport carrier (e.g. automobile, aircraft, marine vessel, courier, etc.). As may be realized, returns or replenishment of goods into the storage array 20 is accomplished in a manner substantially opposite that of the order fulfillment process described above. In other aspects, the automated guided vehicles 10 deliver the containers 40 to any suitable conveyors CONV (FIG. 1) that transport the containers 40 to and from the order filling stations 80 so that the human picker HP or the automated robot 400 (see e.g. FIGS. 3 and 4) picks a certain number of goods from the predetermined storage container 40 and place those goods into one or more order fill containers 540 disposed adjacent the picker HP or robot 400. Here once the goods are removed from the containers 40 the conveyors CONV transfer the containers 40 from the order filling stations 80 to, for example, the automated guided vehicles 10 for returning the containers 40 to the storage spaces 30S or any other suitable location.

As can be seen from the above description, the aspects of the disclosed embodiment provide an autonomous order fulfillment system for use in a warehouse 1 without the typical infrastructure of custom racks/shelving. The aspects of the disclosed embodiment provide for a transportable system (e.g. the system can be easily transported between facilities) that allows for expansion of the system both horizontally and vertically by adding additional racks and/or mezzanine platforms to existing racks. The automated guided vehicles described herein provide for the continual rearrangement of the location of goods within the warehouse based on, for example, any suitable factors such as a demand for a particular good. The automated guided vehicles also eliminate conventional conveyors within the warehouse, including downstream of the picker operation as noted above, where the automated guided vehicles carry and transport the order fill containers 540 from the picking stations 80. The automated guided vehicles carrying storage containers 40 also provide for batch picking of high demand items such that the automated guided vehicle remains in the area of the order filling stations 80 while travelling between the order filling stations 80 for delivering the high demand items to multiple order filling stations 80. The autonomous order fulfillment system described herein further provides for unrestricted human access throughout the storage structure while the autonomous guided vehicles remain operative when humans enter areas in which the autonomous guided vehicles operate. In other words, the autonomous guided vehicles work alongside (e.g. comingle with) human pickers allowing simultaneous manual picker-to-goods order fulfillment and robot goods-to-picker order fulfillment for managing peak loads and other order fulfillment efficiency considerations.

In accordance with one or more aspects of the disclosed embodiment an automated distribution center includes a storage array including stacked racks with predetermined storage locations, for storage containers, arranged along at least one aisle; at least one of the aisles having a base or floor, and a mezzanine platform above the base or floor, the base or floor and mezzanine platform being configured for human picker access to the predetermined storage locations of the racks along the at least one aisle; at least one automated guided vehicle configured for traverse of the base or floor and the mezzanine platform to the predetermined storage locations along the at least one aisle, and configured for holding and transporting one of the storage containers to and from the storage locations; the base or floor and mezzanine platform each having an undeterministic traverse surface for the automated guided vehicle, and the automated guided vehicle is configured so that the undeterministic traverse surface provides holonomic selectable paths for the automated guided vehicle substantially everywhere on the undeterministic traverse surface, each of the paths being freely selectable by the automated guided vehicle for traversing along the aisle on the base or floor; and an order filling station, where one or more goods are picked from one or more of the storage containers to fill one or more orders; wherein the automated guided vehicle is configured to pick the one of the storage containers from one of the storage locations along the at least one aisle and transport the one of the storage containers on the undeterministic traverse surface between the storage array and the order filling station.

In accordance with one or more aspects of the disclosed embodiment the automated guided vehicle is configured for navigation and path selection by simultaneous location and mapping.

In accordance with one or more aspects of the disclosed embodiment the automated guided vehicle is configured for navigation and path selection by detecting beacons or passive tags.

In accordance with one or more aspects of the disclosed embodiment the automated guided vehicle is configured for navigation and path selection by detecting one or more of beacons, passive tags and markers provided within the automated distribution center.

In accordance with one or more aspects of the disclosed embodiment the automated guided vehicle is configured for navigation and path selection by detecting markers provided on the undeterministic traverse surface.

In accordance with one or more aspects of the disclosed embodiment the automated distribution center further includes a controller configured to effect one or more of selection and creation of one or more of the holonomic selectable paths by automated guided vehicle.

In accordance with one or more aspects of the disclosed embodiment the automated guided vehicle is configured to return the one of the storage containers from the order filling station to one of the storage locations.

In accordance with one or more aspects of the disclosed embodiment the one of the storage containers is returned to the same location the one of the storage containers was picked.

In accordance with one or more aspects of the disclosed embodiment the one of the storage containers is returned to a different location than the one of the storage containers was picked.

In accordance with one or more aspects of the disclosed embodiment the automated distribution center further includes a vertical transport system connecting the mezzanine platform and the base or floor.

In accordance with one or more aspects of the disclosed embodiment the vertical transport system configured for automated guided vehicle lift roll on and roll off.

In accordance with one or more aspects of the disclosed embodiment the vertical transport system comprises automated guided vehicle ramps.

In accordance with one or more aspects of the disclosed embodiment the vertical transport system is configured for automated transport of the storage containers between base or floor and mezzanine platform, where the at least one automated guided vehicle transfers the storage containers to and from the vertical transport system.

In accordance with one or more aspects of the disclosed embodiment the automated guided vehicle includes a processor and at least one sensor configured to sense transient features affecting path passage and register such path passage with the processor, in response to which automated guided vehicle changes path from a selected path.

In accordance with one or more aspects of the disclosed embodiment the at least one automated guided vehicle is configured to manipulate the one of the storage containers at one or more predetermined heights.

In accordance with one or more aspects of the disclosed embodiment the order filling station is connected to the undeterministic traverse surface of the base or floor and mezzanine platform at least in part by an automated guided vehicle access way.

In accordance with one or more aspects of the disclosed embodiment the automated distribution center further includes a controller with a warehouse management system configured to receive orders and to identify containers and corresponding storage locations; an automated guided vehicle manager communicably connected with the at least one automated guided vehicle and commanding the at least one automated guided vehicle to the corresponding storage locations for picking at least one of the identified containers; and an automated human picker manager communicably connected with at least one human picker and commanding the at least one human picker to work in concert with the at least one autonomous guided vehicle.

In accordance with one or more aspects of the disclosed embodiment in response to a command, the at least one automated guided vehicle one or more of generates and follows a selected path on the undeterministic traverse surface to the corresponding location by one or more of selecting from and being commanded to follow the holonomic selectable paths, and on sensing transient features affecting the path, changes path from selected path.

In accordance with one or more aspects of the disclosed embodiment the at least one automated guided vehicle has a movable container manipulator configured to engage the storage containers so as to pick and place the one of the storage containers to and from a storage location on the racks, the movable container grip including at least two degrees of freedom, for effect extension along a y axis and a Z axis.

In accordance with one or more aspects of the disclosed embodiment the at least one automated guided vehicle has a movable container manipulator configured to engage the storage containers so as to pick and place the one of the storage containers to and from a storage location on the racks, the movable container grip including at least one degree of freedom, for effecting extension along a Z axis where the at least one automated guided vehicle rotates so that an X axis of the at least one automated guided vehicle faces the storage location.

In accordance with one or more aspects of the disclosed embodiment a Z axis stroke range of the movable container manipulator to pick the one of the storage containers located at the storage location is a height from the undeterministic traverse surface to a human picker upper ergonomic pick and place height.

In accordance with one or more aspects of the disclosed embodiment the order filling station is a manual fill station.

In accordance with one or more aspects of the disclosed embodiment the order filling station is an automatic fill station.

In accordance with one or more aspects of the disclosed embodiment an order fill container loaded at the order filling station is carried by the automated guided vehicle and the automated guided vehicle is configured to transport the order fill container to one of the storage locations in the storage array.

In accordance with one or more aspects of the disclosed embodiment an automated distribution center includes a storage array including stacked racks with predetermined storage locations, for storage containers, arranged along at least one aisle; at least one of the aisles having a base or floor, the base or floor being configured for human picker access to the predetermined storage locations of the racks along the at least one aisle; at least one automated guided vehicle configured for traverse of the base or floor to the predetermined storage locations along the at least one aisle, and configured for holding and transporting one of the storage containers to and from the storage locations; the base or floor having an undeterministic traverse surface for the automated guided vehicle, and the automated guided vehicle is configured so that the undeterministic traverse surface provides holonomic selectable paths for the automated guided vehicle substantially everywhere on the undeterministic traverse surface, each of the paths being freely selectable by the automated guided vehicle for traversing along the aisle on the base or floor; and an order filling station, where one or more goods are picked from one or more of the storage containers to fill one or more orders; wherein the automated guided vehicle is configured to pick the one of the storage containers from one of the storage locations along the at least one aisle and transport the one or the storage containers on the undeterministic traverse surface between the storage array and the order filling station.

In accordance with one or more aspects of the disclosed embodiment the automated guided vehicle is configured for navigation and path selection by one or more of simultaneous location and mapping, by detecting beacons or passive tags, by detecting one or more of beacons, passive tags and markers provided within the automated distribution center.

In accordance with one or more aspects of the disclosed embodiment the automated distribution center further includes a controller configured to effect one or more of selection and creation of one or more of the holonomic selectable paths by automated guided vehicle.

In accordance with one or more aspects of the disclosed embodiment the automated guided vehicle includes a processor and at least one sensor configured to sense transient features affecting path passage and register such path passage with the processor, in response to which automated guided vehicle changes path from a selected path.

In accordance with one or more aspects of the disclosed embodiment the automated distribution center further includes a controller with a warehouse management system or a controller configured to work with an existing warehouse management system, the controller being configured to receive orders and to identify containers and corresponding storage locations; and an automated guided vehicle manager communicably connected with the at least one automated guided vehicle and commanding the at least one automated guided vehicle to the corresponding storage locations for picking at least one of the identified containers.

In accordance with one or more aspects of the disclosed embodiment the at least one automated guided vehicle has a movable container manipulator configured to engage the storage containers so as to pick and place the one of the storage containers to and from a storage location on the racks, the movable container manipulator including at least one degree of freedom, for effecting transfer of containers to and from the at least one automated guided vehicle.

In accordance with one or more aspects of the disclosed embodiment the movable container manipulator includes at least two degrees of freedom, for effect extension of the movable container manipulator along a y axis and a Z axis.

In accordance with one or more aspects of the disclosed embodiment the order filling station is connected to the undeterministic traverse surface of the base or floor by an automated guided vehicle access way.

In accordance with one or more aspects of the disclosed embodiment a method for transporting items in a storage array including stacked racks with predetermined storage locations, for storage containers, arranged along at least one aisle having a base or floor, the method includes providing at least one of the aisles with a mezzanine platform above the base or floor, the base or floor and mezzanine platform allowing human picker access to the predetermined storage locations of the racks along the at least one aisle; providing at least one automated guided vehicle configured for traverse of the base or floor and the mezzanine platform to the predetermined storage locations along the at least one aisle, and configured for holding and transporting one of the storage containers to and from the storage locations; effecting transport of the one of the storage containers, with the at least one automated guided vehicle, on an undeterministic traverse surface of each of the base or floor and mezzanine platform where the undeterministic traverse surface provides holonomic selectable paths for the automated guided vehicle substantially everywhere on the undeterministic traverse surface and each of the paths is freely selectable by the automated guided vehicle for traversing along the aisle on the base or floor; providing an order filling station, where one or more goods are picked from one or more of the storage containers to fill one or more orders; and effecting, at least one automated guided vehicle, picking of the one of the storage containers from one of the storage locations along the at least one aisle and transporting the one of the storage containers on the undeterministic traverse surface to the order filling station.

In accordance with one or more aspects of the disclosed embodiment the method further includes connecting the order filling station to the undeterministic traverse surface of the base or floor and mezzanine platform with an automated guided vehicle access way.

In accordance with one or more aspects of the disclosed embodiment the method further includes effecting automated guided vehicle navigation and path selection by simultaneous location and mapping.

In accordance with one or more aspects of the disclosed embodiment the method further includes effecting automated guided vehicle navigation and path selection by detecting beacons or passive tags.

In accordance with one or more aspects of the disclosed embodiment the method further includes effecting automated guided vehicle navigation and path selection by detecting one or more of beacons, passive tags and markers provided on one or more of the undeterministic traverse surface and storage array.

In accordance with one or more aspects of the disclosed embodiment the method further includes effecting selection of one or more of the holonomic selectable paths with automated guided vehicle.

In accordance with one or more aspects of the disclosed embodiment the one of the storage containers from the order filling station is returned, the at least one automated guided vehicle, to one of the storage locations.

In accordance with one or more aspects of the disclosed embodiment the one of the storage containers is returned to the same location the one of the storage containers was picked.

In accordance with one or more aspects of the disclosed embodiment the one of the storage containers is returned to a different location than the one of the storage containers was picked.

In accordance with one or more aspects of the disclosed embodiment the method further includes providing a vertical transport system connecting the mezzanine platform and the base or floor.

In accordance with one or more aspects of the disclosed embodiment the method further includes effecting a change from a selected path of the automated guided vehicle with at least one sensor of the automated guided vehicle that senses transient features affecting path passage and registers such path passage with a processor of the automated guided vehicle, in response to which the automated guided vehicle changes path from a selected path.

In accordance with one or more aspects of the disclosed embodiment the method further includes transporting the one or more orders from the order filling station to a shipping station with the at least one automated guided vehicle.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. An automated distribution center comprising:
    a storage array including stacked racks with predetermined storage locations, for storage containers, arranged along at least one aisle;
    at least one of the aisles having a base or floor, and a mezzanine platform above the base or floor so that the base or floor and the mezzanine platform are configured so as to provide both human picker access and automated guided vehicle access to the predetermined storage locations of the racks along the at least one aisle;
    at least one automated guided vehicle picker configured for traverse of the base or floor and the mezzanine platform to the predetermined storage locations along the at least one aisle, and configured for holding and transporting one of the storage containers to and from the storage locations;
    the base or floor and mezzanine platform each having a corresponding floor rack aisle and mezzanine platform rack aisle, each respective floor rack aisle and mezzanine platform rack aisle defining a different and undeterministic traverse surface corresponding to the base or floor and mezzanine platform respectively for the automated guided vehicle picker, and the automated guided vehicle picker is configured so that each of the different undeterministic traverse surfaces of each respective floor rack aisle and mezzanine platform rack aisle provides holonomic selectable paths for the automated guided vehicle picker substantially everywhere on a respective one of the different undeterministic traverse surface, each of the paths being freely selectable by the automated guided vehicle picker for traversing along the aisle on the base or floor;

and an order filling station, where one or more goods are picked from one or more of the storage containers to fill one or more orders;

wherein the automated guided vehicle picker is configured to pick the one of the storage containers from one of the storage locations along the at least one aisle and transport the one of the storage containers on the respective one of the undeterministic traverse surface between the storage array and the order filling station.

2. The automated distribution center of claim 1, wherein the automated guided vehicle picker is configured for navigation and path selection by one or more of simultaneous location and mapping, detecting beacons or passive tags, and detecting one or more of beacons, passive tags and markers provided within the automated distribution center.

3. The automated distribution center of claim 1, wherein the automated guided vehicle picker is configured for navigation and path selection by detecting markers provided on the respective one of the undeterministic traverse surface.

4. The automated distribution center of claim 1, further comprising a controller configured to effect one or more of selection and creation of one or more of the holonomic selectable paths by automated guided vehicle picker.

5. The automated distribution center of claim 1, wherein the automated guided vehicle picker is configured to return the one of the storage containers from the order filling station to one of the storage locations.

6. The automated distribution center of claim 1, wherein the automated guided vehicle picker comprises a processor and at least one sensor configured to sense transient features affecting path passage and register such path passage with the processor, in response to which automated guided vehicle picker changes path from a selected path.

7. The automated distribution center of claim 1, further comprising a vertical transport system connecting the mezzanine platform and the base or floor.

8. The automated distribution center of claim 7, wherein the vertical transport system is configured for automated guided vehicle picker lift roll on and roll off.

9. The automated distribution center of claim 7, wherein the vertical transport system comprises automated guided vehicle picker ramps.

10. The automated distribution center of claim 1, further comprising:
a controller with a warehouse management system configured to receive orders and to identify containers and corresponding storage locations;
a automated guided vehicle picker manager communicably connected with the at least one automated guided vehicle picker and commanding the at least one automated guided vehicle picker to the corresponding storage locations for picking at least one of the identified containers;
and an automated human picker manager communicably connected with at least one human picker and commanding the at least one human picker to work in concert with the at least one autonomous guided vehicle.

11. The automated distribution center of claim 10, wherein in response to a command, the at least one automated guided vehicle picker one or more of generates and follows a selected path on the respective one of the undeterministic traverse surface to the corresponding location by one or more of selecting from and being commanded to follow the holonomic selectable paths, and on sensing transient features affecting the path, changes path from selected path.

12. The automated distribution center of claim 10, wherein the at least one automated guided vehicle picker has a movable container manipulator configured to engage the storage containers so as to pick and place the one of the storage containers to and from a storage location on the racks, the movable container grip including at least two degrees of freedom, for effect extension along a y axis and a Z axis.

13. The automated distribution center of claim 10, wherein the at least one automated guided vehicle picker has a movable container manipulator configured to engage the storage containers so as to pick and place the one of the storage containers to and from a storage location on the racks, the movable container grip including at least one degree of freedom, for effecting extension along a Z axis where the at least one automated guided vehicle picker rotates so that an X axis of the at least one automated guided vehicle picker faces the storage location.

14. A method for transporting items in a storage array comprising:
stacked racks with predetermined storage locations, for storage containers, arranged along at least one aisle having a base or floor, the method includes providing at least one of the aisles with a mezzanine platform supported by the stacked racks above the base or floor so that the base or floor and mezzanine platform allow human picker access to the predetermined storage locations of the racks along the at least one aisle;
providing at least one automated guided vehicle picker configured for traverse of the base or floor and the mezzanine platform to the predetermined storage locations along the at least one aisle, and configured for holding and transporting one of the storage containers to and from the storage locations;
effecting transport of the one of the storage containers, with the at least one automated guided vehicle picker, on a respective undeterministic traverse surface of a rack aisle of each of the base or floor and mezzanine platform where the respective undeterministic traverse surface of the rack aisle of the base or floor is different than the undeterministic traverse surface of the rack aisle of the mezzanine platform and each of the different undeterministic traverse surfaces of each respective rack aisles of the base or floor and the mezzanine platform provides holonomic selectable paths for the automated guided vehicle picker substantially everywhere on the respective undeterministic traverse surface and each of the paths is freely selectable by the automated guided vehicle picker for traversing along the aisle on the base or floor;
providing an order filling station, where one or more goods are picked from one or more of the storage containers to fill one or more orders;
and effecting, at least one automated guided vehicle picker, picking of the one of the storage containers from one of the storage locations along the at least one aisle and transporting the one of the storage containers on the respective undeterministic traverse surface to the order filling station.

15. The method of claim 14, further comprises effecting selection of one or more of the holonomic selectable paths with the automated guided vehicle picker.

16. The method of claim 14, further comprises effecting a change from a selected path of the automated guided vehicle picker with at least one sensor of the automated guided vehicle picker that senses transient features affecting path passage and registers such path passage with a processor of the automated guided vehicle picker, in response to which the automated guided vehicle picker changes path from a selected path.

\* \* \* \* \*